United States Patent [19]
Cavanagh

[11] 3,887,729
[45] June 3, 1975

[54] METHOD FOR COATING GLASS CONTAINERS

[75] Inventor: Joseph C. Cavanagh, Bay Shores, N.Y.

[73] Assignee: Midland Glass Company, Cliffwood, N.J.

[22] Filed: Nov. 15, 1973

[21] Appl. No.: 415,972

[52] U.S. Cl. ......... 427/195; 65/60; 118/70; 118/308; 118/324; 118/631; 118/633
[51] Int. Cl. ...................... B05b 5/02; B44d 1/094
[58] Field of Search ............. 117/16, 17, 18, 19, 21, 117/94, 97, 104 R, 105.3, 124 E, 102 A; 118/70, 308, 319, 324, 630, 631, 632, 633, 634, 635; 65/60

[56] References Cited
UNITED STATES PATENTS

| | | | |
|---|---|---|---|
| 2,319,474 | 5/1943 | Price | 134/128 |
| 2,366,515 | 1/1945 | Gladfelter et al. | 198/27 |
| 2,888,362 | 5/1959 | Starkey | 117/47 R |
| 3,007,594 | 11/1961 | Wallace | 215/1 |
| 3,415,673 | 12/1968 | Clock | 117/17 |
| 3,677,226 | 7/1972 | Stepenske et al. | 118/70 |
| 3,698,586 | 10/1972 | Terner | 215/12 R |
| 3,741,744 | 6/1973 | Bowman | 117/94 |
| 3,765,856 | 10/1973 | Bowman | 118/324 |

*Primary Examiner*—Michael Sofocleous
*Attorney, Agent, or Firm*—Ryder, McAulay, Fields, Fisher & Goldstein

[57] ABSTRACT

In a process for providing a glass container, such as a jar or bottle, with a plastic coating, the container is held on a first work holder where the plastic coating is applied and is then transferred to a second work holder for curing of the plastic. Before the first work holder contacts a second container for application of plastic, any plastic retained on the work holder from the first coating operation is removed to prevent a buildup so that the work holder can properly hold subsequent glass containers which are to be coated.

11 Claims, 2 Drawing Figures

METHOD FOR COATING GLASS CONTAINERS

BACKGROUND OF THE INVENTION

The coating of glassware with plastic so as to retain the inherent strength of the glassware, precluding its loss through scratching of the container surface, has become increasingly more common. For example, application of such coatings are shown in U.S. Pat. No. 3,007,594—Wallace and No. 3,415,673—Clock, along with U.S. Pat. No. 3,698,586—Terner. While these patents describe, generally, methods for applying a plastic coating, as they relate to the resultant structures, they do not provide for a specific method of coating glass containers with plastic when the material applied is in powder form.

In previously described methods for the application of powdered plastics to glass containers, the glass container has been held on a work holder while the plastic is applied, and subsequently, when the plastic is cured to the glass container. Since the spray application of plastic, particularly in powder form, can never be totally confined to the specific area to be coated, some of the plastic material will, of necessity, adhere to the work holder. If this same work holder is then conducted through the curing process, the powdered plastic which has adhered to it will, naturally, cure to the work holder as well as to the container. As a consequence of this curing, the work holder will reach a state where it is either so adherent to the glass container, that the glass container cannot easily be removed from it subsequent to the curing process, or will become so slippery that it will not hold the glass container in the first stage of the process, depending upon the type of plastic applied.

As a consequence of the recited difficulties in applying plastic to glass containers, the processing has been subject to a number of drawbacks and a large number of work holders must be employed for a functioning system. The larger number is necessitated by the fact that the work holders must frequently be removed from service in order to remove the adhered plastic. Thus, a plurality of work holders, not actually required for direct processing of the containers must be used. Systems for treatment of containers employing more than one work holder have also been shown in the prior art. These systems are illustrated, for example, in U.S. Pat. No. 2,888,362—Starkey, U.S. Pat. No. 2,366,515—Gladfelter, et al., and U.S. Pat. No. 2,319,474—Price. The Starkey patent shows an electrostatic coating operation with two conveyors to allow for placement of the object to be coated in two different positions. However, there is no suggestion of cleaning the work holder between operations so as to render it more usable in a continuous process. In Gladfelter, et al., wax is coated on the interior of a can which is then placed on a second conveyor to allow the wax to run away from the opening and concentrate in desirable areas. Again, there is no suggestion of cleaning the first work holder. This same limitation is found in the Price patent. None relates to separate work holders for coating and curing steps.

SUMMARY OF THE INVENTION

In accordance with the present invention, and to ameliorate the previously recited problems, a glass container is coated with a plastic in accordance with the present invention, preferably with the dry plastic, employing two different work holders. In the first stage of the process, a first work holder lifts the clean glass container, or one which has been treated with a material other than the powdered plastic to be applied. This work holder carries the glass container through a coating system where the powdered plastic is applied to the glass container. Preferably, the application is by electrostatic means.

Following coating of the glass container with the powdered plastic, the container is transferred to a second work holder. This second work holder carries the coated glass container through a second phase of the process where the plastic coating is cured, for example, by heating of the container with the adhered coating in an oven to fuse the coating.

Before the first work holder again contacts a glass container which is to be coated with the plastic, any of the plastic which may have been adhered to it is removed. Particularly, when the container is coated with a dry, powdered plastic material, removal is easily accomplished by merely blowing the work holder with a gas stream, such as an air stream. This blowing acts to dislodge any of the powdered plastic which may be adhered to the work holder and may be accomplished in such a manner that any of the plastic removed is recycled to the feed stream where it can be reapplied.

Because the first work holder is cleaned of any plastic coating before contacting a glass container and, further, is not subjected to a curing operation, a film of plastic will not form on it. Thus, the problem of having this first work holder coated with an adherent plastic or with one which will prevent its properly gripping the glass container, is ameliorated. As the second work holder is not subjected to a coating operation, the mere carrying out of a curing operation will not form a film of plastic upon it and the two work holders can be essentially recycled in their processing operations, ad infinitum, without the danger of applying an undesirable, at least semipermanent, plastic coating.

DESCRIPTION OF THE PREFERRED EMBODIMENTS

Figures 1, 2:
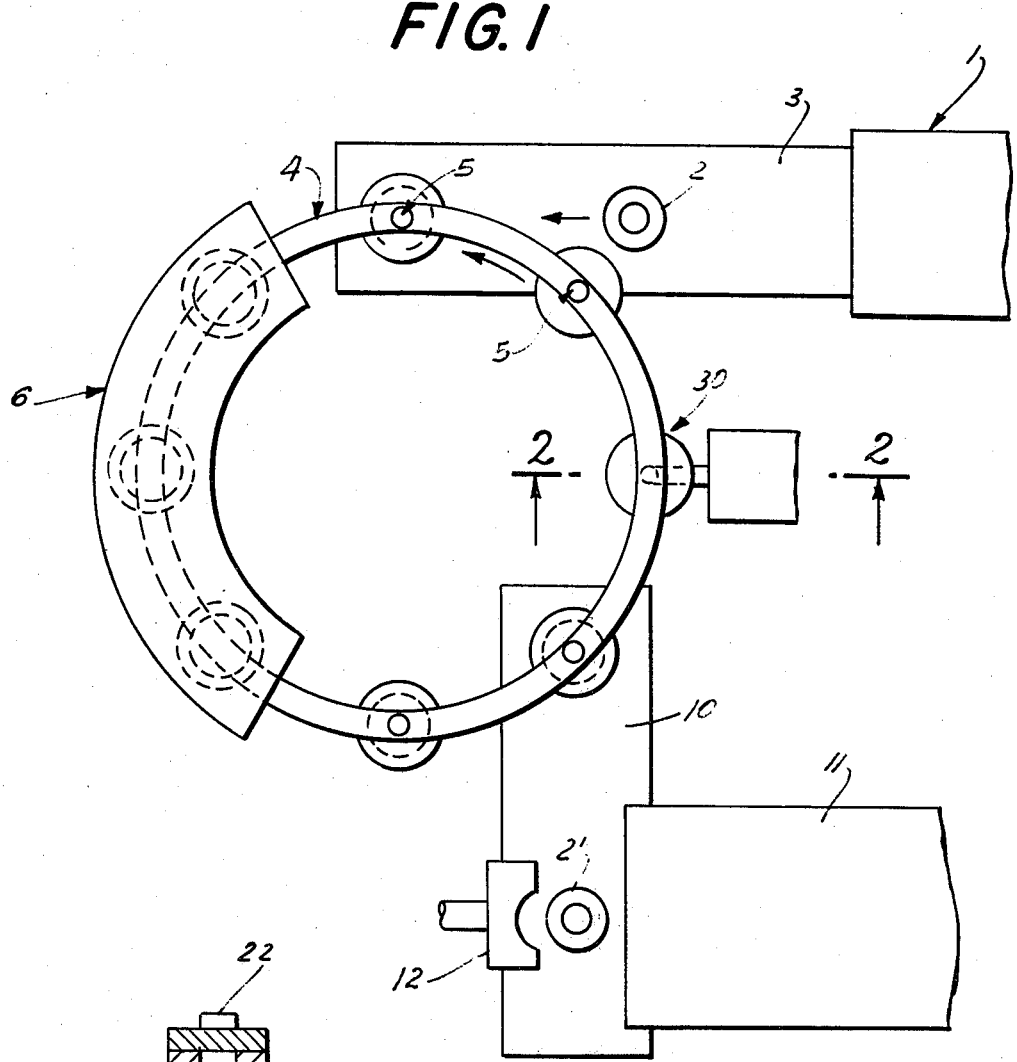
FIG. 1 is a top plan view of an apparatus for carrying out the method of the present invention.
FIG. 2 is a view taken along the line 2—2 of FIG. 1.

Referring to the drawings, and particularly FIG. 1, a system is illustrated for coating of a plastic material onto a glass container. The system includes means 1 illustrating either equipment for formation of the virgin glass container or equipment in which the glass container is subjected to a previous coating operation. For example, the container may be subject to a treatment for abrasion protection, such as that described in Carl, et al., U.S. Pat. No. 3,323,889, or Scholes, et al., U.S. Pat. No. 3,420,693. These patents generally describe the application of thin layers of a metallic compound, followed by equally thin layers of a lubricating material. Such treatments may be applied to the glass containers which are to be coated in accordance with the present invention, prior to application of the plastic coating.

The glass containers 2 are carried from the referenced equipment by a suitable conveying means, such as conveyor belt 3. The conveyor belt 3 carries the containers 2 to the vicinity of a carousel or round table conveyor 4. The carousel is equipped with a plurality of work holders 5, better illustrated in FIG. 2, which will be described in greater detail later. As a work holder 5 comes into juxtaposition with a glass container 2, it grasps this container and carries it on the carousel. On the path of travel, the work holders 5, with attached containers 2, pass through coating area 6 where a plastic coating is applied to the container. This coating may be uniform, or it may be over selected areas of the container. One embodiment of this selective coating is set forth in copending application Ser. No. 371,696-- -Cavanagh, et al., filed June 20, 1973, and assigned to the same assignee as the present invention. As pointed out in the aforereferenced application, the plastic which is applied can be selected from a variety of materials including Surlyn, an ethylene methacrylic acid copolymer in which part of the acid has been neutralized with sodium ions.

On continued movement of the work holder 5 with attached container 2 around the carousel, the container comes into juxtaposition with a further work holder which will convey it through equipment acting to cure the plastic onto the container. As illustrated in FIG. 1, the container may come into juxtaposition with a second conveyor belt 10. This second conveyor belt conveys the container 2', now carrying a plastic coating, to the entrance of equipment 11 where the plastic coating is cured onto the glass container. The type of work holder employed in moving the coated glass container 2' through the curing equipment is not critical to the present invention. It may be, as illustrated in FIG. 1, means 12 which will attach to or come in contact with the neck or central portion of the container to force it through equipment 11. Similarly, the work holder may be further conveyor belt on which the coated container 2' rests as it is moved through the curing apparatus. As indicated, the particular type of work holder employed in the second operation is not the critical feature of the present invention, but merely the fact that a work holder, separate and distinct from that used in the coating operation, is employed.

One type of work holder which can be employed for either operation, and particularly the coating operation, is illustrated in FIG. 2. This type of work holder is particularly adapted for use when narrow mouthed bottles, of the type employed for packaging of soft drinks and beer, are to be coated. The work holder here includes a portion 20 which fits around the outside of the bottle neck and a member 21 which fits within the opening. The work holder 5 of FIG. 2 is attached, in any suitable manner, to carousel 4. A vacuum may be drawn through area 22 to aid in holding the bottle to the work holder.

As illustrated in FIG. 2, the work holder is being moved through area 30 of FIG. 1. In this area, any of the plastic coating material which may have been adhered to the first work holder 5 is removed before the work holder again contacts a glass container 2 which is to be coated.

As illustrated in FIG. 2, the means for removing the plastic which may have been adhered to work holder 5 may include jet 31. The gas jet may blow continuously, as illustrated, and will act upon each work holder 5, in turn, as it passes through area 30. Similarly, the gas jet may work intermittently, only as a work holder passes through the area. Any powdered plastic removed from work holder 5 in area 30 may be recirculated to area 6 to again be applied to a container 2 as it passes through the coating area.

It will be apparent that the jet 31 may involve an air spray or other types of gases may be applied from member 31, including inert gases, such as nitrogen. Again, the dry, powdered plastic may be recirculated to the coating area 6. If desired, for some plastics, a solvent material may be applied through member 31 to dissolve any plastic which may be adhered to the work holder and to thoroughly wash the work holder. The type of solvent will, obviously, vary with the particular type of plastic being applied.

Whatever the material being applied through member 31, the object of the treatment is to remove any plastic which may have become adhered to work holder 5 upon passage through coating area 6. So long as the plastic is removed at this point in the process, before the plastic is subjected to a curing operation, it can easily be removed from the work holder. Thus, there is a buildup of plastic on the work holder and there is little, if any, danger of the plastic becoming cured to a state where it becomes adhesive, preventing removal of the container from the work holder, or of becoming so slippery that the work holder 5 is unable to grasp the next container 2 which comes into its path. Accordingly, there are considerable savings in the number of work holders required for carrying out of the process and the cleaning operation is substantially more facile and more economic.

In accordance with the present invention, a process has been described for coating of glass containers with plastic materials where the work holders used in the various operations of the process can be employed continually without extreme cleaning measures being required. Thus, a system which is more easily employed and which is employed more economically than those of the prior art has been shown. The invention should not be considered as limited to the specific embodiments shown and described, but only as limited by the appended claims.

I claim:

1. A method for applying a powdered synthetic resin coating to a glass container comprising:
   a. attaching a first work holder to said container;
   b. conducting said work holder, with said attached container, through a coating zone, so as to coat said container with said powdered synthetic resin;
   c. removing said coated container from said first work holder;
   d. attaching a second work holder to said coated container; and
   e. conveying said second work holder with said attached, coated container through a curing zone to fuse said coating.

2. The method of claim 1 comprising, in addition, subsequent to removal of said container, attaching said first work holder to a further container.

3. The method of claim 2 comprising, in addition, prior to attachment to said second container, cleaning said first work holder of said adhered powdered synthetic resin plastic.

4. The method of claim 3 comprising cleaning said first work holder with a gas jet.

5. The method of claim 4 wherein the gas is air.

6. The method of claim 1 wherein said container is a narrow-mouthed glass bottle and wherein said attaching of said first work holder comprises grasping the container at the neck.

7. A method for coating a glass container with a powdered synthetic resin comprising:
   a. attaching said container to a first work holder;
   b. conducting said first work holder, with said container attached, through a coating zone, so as to coat said container with said powdered synthetic resin;
   c. removing said coated container from said first work holder;
   d. attaching said coated container to a second work holder;
   e. conducting said second work holder with said attached, coated container through a curing zone to fuse said coating; and
   f. cleaning said first work holder after removal of said container from said work holder.

8. The method of claim 7 comprising, in addition, subsequent to removal of said container and cleaning of said work holder, attaching said first work holder to a further container.

9. The method of claim 7 including applying said powdered synthetic resin coating by an electrostatic process in said coating zone.

10. The method of claim 7 including cleaning said first work holder by an air jet.

11. The method of claim 7 comprising, in addition, treating said glass container prior to coating said container with said powdered synthetic resin.

* * * * *

UNITED STATES PATENT OFFICE
CERTIFICATE OF CORRECTION

PATENT NO. : 3,887,729
DATED : June 3, 1975
INVENTOR(S) : Joseph C. Cavanagh

It is certified that error appears in the above-identified patent and that said Letters Patent are hereby corrected as shown below:

On page 1, in item [75], "Bay Shores" should be --Bay Shore--.

Col. 1, line 39, "larger" should be --large--.

Col. 3, line 36, insert --a-- after "may be".

Col. 3, line 62, "which may have been adhered" should be --which may have adhered--.

Col. 4, line 20, "there is a buildup of plastic" should be --there is no buildup of plastic--.

Signed and Sealed this twenty-sixth Day of August 1975

[SEAL]

Attest:

RUTH C. MASON
Attesting Officer

C. MARSHALL DANN
Commissioner of Patents and Trademarks